(12) United States Patent
Moore et al.

(10) Patent No.: US 7,665,910 B2
(45) Date of Patent: Feb. 23, 2010

(54) POSITIONING PLATE FOR OPTICAL SUBASSEMBLY

(75) Inventors: Joshua Moore, Sunnyvale, CA (US); Donald A. Ice, Milpitas, CA (US); Chris Togami, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 162 days.

(21) Appl. No.: 12/039,598

(22) Filed: Feb. 28, 2008

(65) Prior Publication Data

US 2008/0205896 A1    Aug. 28, 2008

Related U.S. Application Data

(60) Provisional application No. 60/892,199, filed on Feb. 28, 2007.

(51) Int. Cl.
*G02B 6/42* (2006.01)
*H04B 10/00* (2006.01)

(52) U.S. Cl. .................. 385/92; 385/88; 398/135

(58) Field of Classification Search ............. 385/88–92; 398/135, 139
See application file for complete search history.

(56) References Cited

U.S. PATENT DOCUMENTS

2002/0110336 A1 *  8/2002  Dair et al. .................. 385/92

OTHER PUBLICATIONS

Moore, Joshua et al., Collar Clip for an Electronic Module, U.S. Appl. No. 12/038,689, filed Feb. 27, 2008.
Moore, Joshua et al., Printed Circuit Board Positioning Mechanism, U.S. Appl. No. 12/038,708, filed Feb. 27, 2008.
Moore, Joshua et al., Rotatable Top Shell, U.S. Appl. No. 12/039,677, filed Feb. 28, 2008.
Moore, Joshua, Angular Seam for an Electronic Module, U.S. Appl. No. 12/038,721, filed Feb. 27, 2008.
Moore, Joshua, Optical Subassembly Positioning Device for an Electronic Module, U.S. Appl. No. 12/038,784, filed Feb. 27, 2008.

* cited by examiner

*Primary Examiner*—Frank G Font
*Assistant Examiner*—Michael P Mooney
(74) *Attorney, Agent, or Firm*—Workman Nydegger

(57) ABSTRACT

In one example, an optical subassembly positioning plate is provided that includes a substantially flat body that defines at least one edge. A port is defined in the body. The port is configured to receive and secure an optical subassembly in an x-direction and a y-direction when said optical subassembly positioning plate is positioned within an optoelectronic transceiver module. A plurality of fingers is defined along at least one edge of the body. Each of the plurality of fingers is configured to contact a shell of the optoelectronic transceiver module so as to bias a flange of the optical subassembly against a portion of the shell of the optoelectronic transceiver module such that the optical subassembly is substantially retained in a z-direction when the optical subassembly positioning plate is positioned within the optoelectronic transceiver module.

20 Claims, 4 Drawing Sheets

POSITIONING PLATE FOR OPTICAL SUBASSEMBLY

CROSS-REFERENCE TO RELATED APPLICATIONS

This application claims priority to U.S. Provisional Patent Application Ser. No. 60/892,199 filed on Feb. 28, 2007, entitled ELECTRONIC MODULE MECHANICAL SYSTEMS, which is incorporated herein by reference in its entirety.

BACKGROUND OF THE INVENTION

1. The Field of the Invention

The present invention generally relates to the field of optoelectronic modules. More particularly, the present invention relates to a positioning plate for retaining optical subassemblies within an optoelectronic transceiver.

2. The Relevant Technology

Modules, such as electronic or optoelectronic transceiver or transponder modules, are increasingly used in electronic and optoelectronic communication. Some modules can be plugged into a variety of host networking equipment. Multi-Source Agreements ("MSAs"), such as the SFF MSA, the SFP MSA, and the SFP+ (IPF) MSA specify, among other things, package dimensions for modules. Conformity with an MSA allows a module to be plugged into host equipment designed in compliance with the MSA. The modules typically communicate with a printed circuit board of a host device by transmitting electrical signals to the printed circuit board and receiving electrical signals from the printed circuit board. These electrical signals can then be transmitted by the module outside the host device as optical and/or electrical signals.

One common difficulty associated with electronic modules concerns the establishment and maintenance of accurate optical alignment between various optical components. Where optical components within an electronic module are not accurately aligned, optical signals traveling between the optical components may experience interference. This interference can impair the proper operation of the electronic module.

One of the major challenges associated with many modules concern the assembly of the modules. For example, a module generally includes various components that must be secured within the module. Due to limitations in size and space, it can be difficult to secure components accurately and permanently within a module.

Factors such as manufacturing tolerances can cause difficulties in accurately securing the components within the module. Further, the components can be subjected to vibrations, which may cause potential damage to the components of the module resulting in malfunctioning of the module.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention. In general, example embodiments of the invention relate to a positioning plate configured for retaining one or more optical subassemblies in an x-direction, a y-direction, and a z-direction within an optoelectronic transceiver module. The example optical subassembly positioning plate as disclosed herein includes features that enable to receive and secure one or more optical subassemblies in the x-direction and the y-direction. Further, the example optical subassembly positioning plate includes features that enable to contact a shell of the optoelectronic transceiver module so as to bias a flange of one or more optical subassemblies against a portion of the shell of the optoelectronic transceiver module such that one or more optical subassemblies are substantially retained in the z-direction when the plate is positioned within the optoelectronic transceiver module.

In one example embodiment, an optical subassembly positioning plate includes a substantially flat body that defines at least one edge. A port is defined in the body. The port is configured to receive and secure an optical subassembly in an x-direction and a y-direction when said optical subassembly positioning plate is positioned within an optoelectronic transceiver module. A plurality of fingers is defined along at least one edge of the body. Each of the plurality of fingers is configured to contact a shell of the optoelectronic transceiver module so as to bias a flange of the optical subassembly against a portion of the shell of the optoelectronic transceiver module such that the optical subassembly is substantially retained in a z-direction when the optical subassembly positioning plate is positioned within the optoelectronic transceiver module.

In another example embodiment, an optical subassembly positioning plate includes a substantially flat body that defines at least one edge. A first port is defined in the body. The first port is configured to receive and secure a first optical subassembly in an x-direction and a y-direction when the optical subassembly positioning plate is positioned within an optoelectronic transceiver module. A second port defined in the body, the second port is configured to receive and secure a second optical subassembly in an x-direction and a y-direction when the optical subassembly positioning plate is positioned within the optoelectronic transceiver module. A plurality of fingers is defined along at least one edge of the body. Each of the plurality of fingers is configured to contact a shell of the optoelectronic transceiver module so as to bias a flange of the first optical subassembly and a flange of the second optical subassembly against a portion of the shell of the optoelectronic transceiver module such that the first and second optical subassemblies are substantially retained in a z-direction when the optical subassembly positioning plate is positioned within the optoelectronic transceiver module.

In yet another example embodiment, an optoelectronic device for use in an optical communication network is disclosed. The optoelectronic device includes a shell, a first optical subassembly, and a second optical subassembly. The shell defines a slot configured to receive an optical subassembly positioning plate. The optical subassembly positioning plate includes a body. The body defines a first port and a second port. Each of the first and second port is configured to receive and secure one of the first optical subassembly and the second optical subassembly, respectively, within the optoelectronic device. A plurality of fingers is defined along at least one edge of the body. Each of the plurality of fingers is configured to contact the shell of the optoelectronic device so as to bias a flange of one of the first optical subassembly and the second optical subassembly against a portion of the shell.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
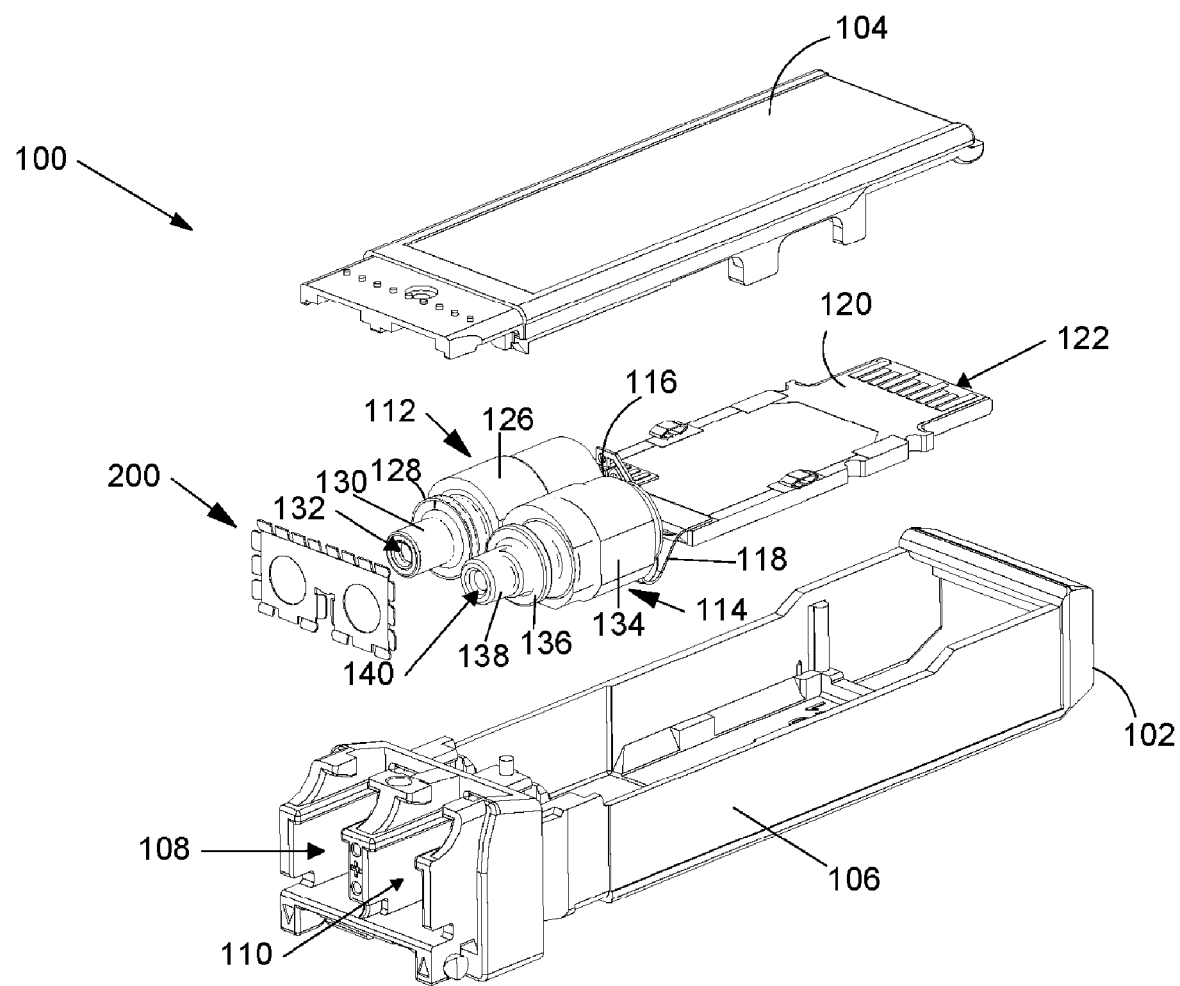
FIG. 1 illustrates an exploded view of an example optoelectronic transceiver module in accordance with an embodiment of the present invention.

Embodiments of the invention are concerned with retaining components such as optical subassemblies (OSAs) within modules such as, but is not limited to, optoelectronic transceiver modules. Embodiments of the invention provide an optical subassembly positioning plate therefor. In one embodiment, one or more ports defined in the body of the positioning plate are configured for receiving and securing the optical subassemblies within the module. The body defines a plurality of edges on which one or more resilient members compliant with the design of the module are located for retaining the OSAs in position within the optoelectronic transceiver module, thereby securely retaining the OSAs in x, y and z directions.

The afore-mentioned members may also serve to prevent damage to the optical subassemblies, for instance, whenever the optoelectronic transceiver module is subject to shock forces. In this embodiment, the afore-mentioned members can dampen the vibrations caused due to such physical shock. It will be understood, with the benefit of the present disclosure, that the underlying principle and operation of the example optical subassembly positioning plate configurations disclosed herein can be applied to a wide variety of optoelectronic modules, such as transceivers, transmitters, receivers, transponders, and the like or any combination thereof.

Embodiments of the present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can be used, for example, in optical communication networks, telecommunications networks, local area networks, metro area networks, storage area networks, wide area networks, and the like.

In one embodiment, the optoelectronic device may be employed in an optical communication network, where the optoelectronic device is used for transmitting and/or receiving information via the network from one node to another in the form of optical and/or electrical signals. The example optoelectronic device operating in the network can include, among other components, a transmitter. The transmitter comprises an optical transmitter such as, but is not limited to, a laser, for converting electrical signals, containing data, received from a network host device, such as, but not limited to, a computer or switch to a modulated optical signal. The optical signal can then be transmitted via the optical interfaces, and the optical fiber cable in the network to a desired remote location. The optoelectronic device can also include a receiver. The receiver comprises an optical receiver such as, but is not limited to, a photodetector. The photodetector is used for converting the optical signals form the desired remote location to electrical signals. The electrical signals are then transmitted to the network host device for further processing and transmission in the network.

Referring first to FIG. 1, one embodiment of an example optoelectronic transceiver module 100 for use in transmitting and receiving optical signals in connection with a host device (not shown) is illustrated. The optoelectronic transceiver module 100 includes various components, including, but not limited to, a shell 102 that includes a top shell 104 and a bottom shell 106, and an output port 108 and an input port 110 defined in the bottom shell 106. The top shell 104 and the bottom shell 106 can be formed using a die casting process. One example material from which the top shell 104 and the bottom shell 106 can be die cast is zinc, although the top shell 104 and the bottom shell 106 may alternately or additionally be die cast or machined from other suitable materials such as aluminum.

The example optoelectronic transceiver module 100 also includes a transmitter optical subassembly (TOSA) 112, a receiver optical subassembly (ROSA) 114, electrical interfaces 116, 118, and a printed circuit board (PCB) 120 having an edge connector 122. The two electrical interfaces 116, 118 are used to electrically connect the TOSA 112 and the ROSA 114, respectively, to the PCB 120.

The TOSA 112 of the optoelectronic transceiver module 100 includes a barrel 126 within which an optical transmitter, such as a laser, (not shown) is disposed. The optical transmitter is configured to convert electrical signals received through the PCB 120 from a host device (not shown) into corresponding optical signals. The TOSA 112 also includes a flange 128 and a nosepiece 130. The nosepiece 130 defines a port 132. The port 132 is configured to optically connect the optical transmitter disposed within the barrel 126 with a fiber-ferrule (not shown) disposed within the output port 108.

Similarly, the ROSA 114 of the optoelectronic transceiver module 100 includes a barrel 134, a flange 136, and a nosepiece 138. The nosepiece 138 defines a port 140. The port 140 is configured to optically connect an optical receiver, such as a photodiode (not shown), disposed within the barrel 134 to a fiber-ferrule (not shown) disposed within the input port 110. The optical receiver is configured to convert optical signals received from the fiber-ferrule into corresponding electrical signals for transmission to a host device (not shown) through the PCB 120.

The optoelectronic transceiver module 100 additionally includes an OSA positioning plate 200 configured to secure the TOSA 112 and the ROSA 114 within the optoelectronic transceiver module 100. Additional details regarding the OSA positioning plate 200 will be provided below.

The optoelectronic transceiver module 100 can be configured for optical signal transmission and reception at a variety of per-second data rates including, but not limited to, 1 Gbit, 2 Gbit, 2.5 Gbit, 4 Gbit, 8 Gbit, 10 Gbit, or higher. Furthermore, the optoelectronic transceiver module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic transceiver module 100 can be configured to support various transmission standards including, but not limited to, Fast Ethernet, Gigabit Ethernet, 10 Gigabit Ethernet, and 1×, 2×, 4×, and 10× Fiber Channel. In addition, although one example of the optoelectronic transceiver module 100 is configured to have a form factor that is substantially compliant with the SFP+ (IPF) MSA, the optoelectronic transceiver module 100 can alternatively be configured to have a variety of different form factors that are substantially compliant with other MSAs including, but not limited to, the SFF MSA or the SFP MSA.

Figure 2:
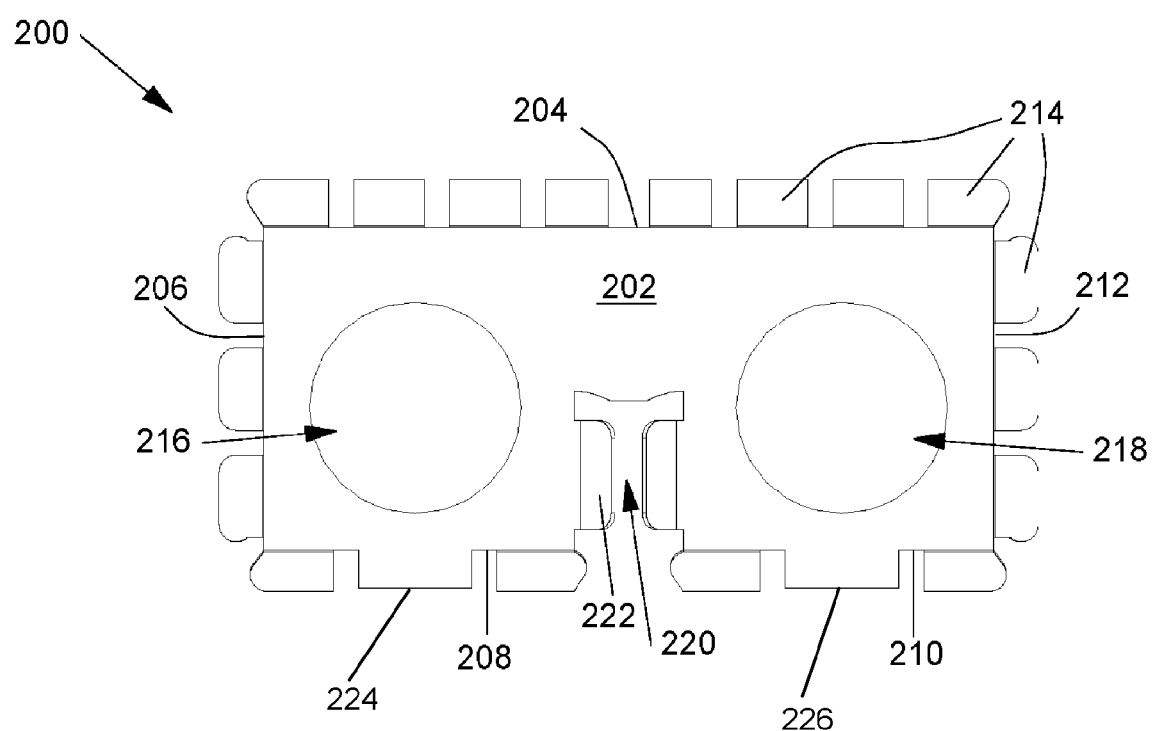
FIG. 2 illustrates a front view of an optical subassembly positioning plate according to an embodiment of the present invention.
Figure 3:
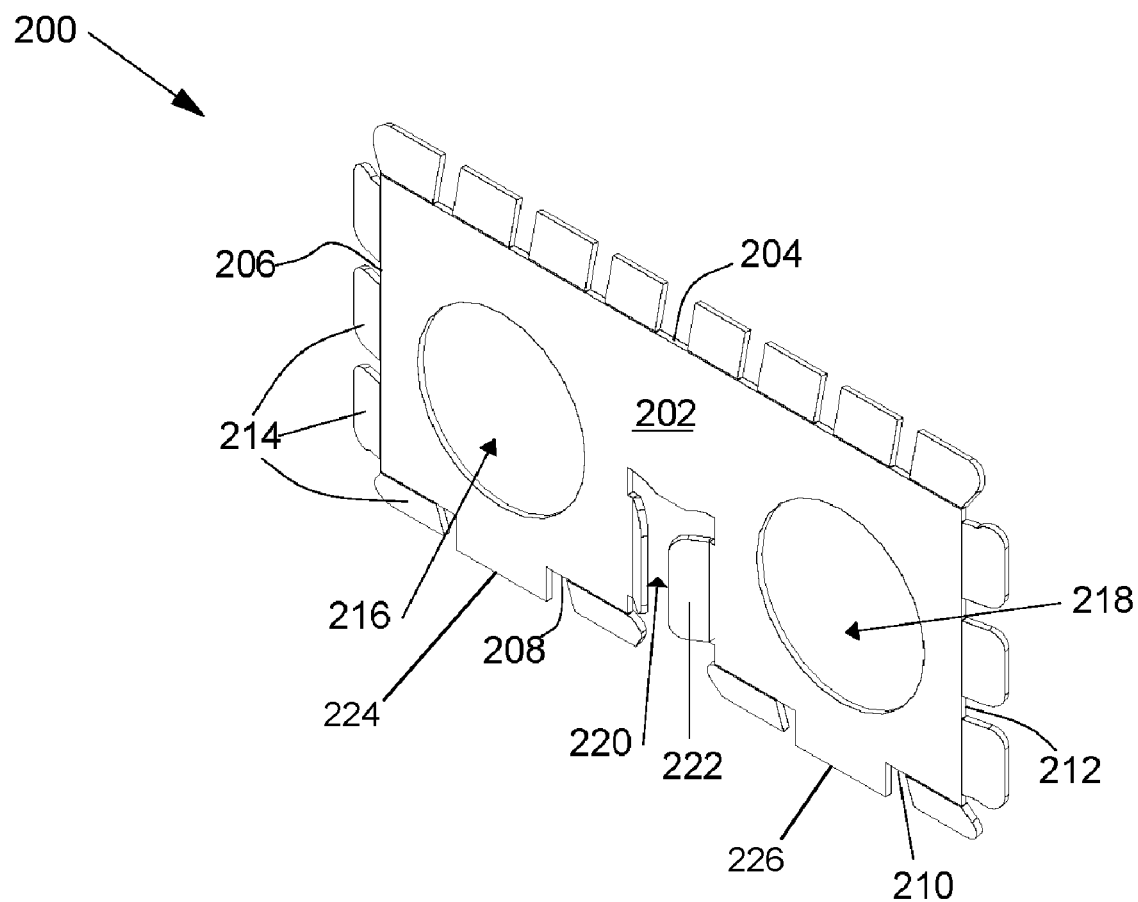
FIG. 3 illustrates an isometric view of an optical subassembly positioning plate according to an embodiment of the present invention.

With additional reference to FIGS. 2 and 3, details are provided concerning one embodiment of an OSA positioning plate 200 that may be employed in the optoelectronic transceiver module 100 of FIG. 1 for accurately securing TOSA 112 and ROSA 114 within the shell 102. In this example, the OSA positioning plate 200 includes a substantially flat body 202. The body 202 defines a plurality of edges 204, 206, 208, 210, 212 on which a plurality of fingers 214 are located. The body 202 of the OSA positioning plate 200 also defines a first port 216 and a second port 218. Further the body 202 defines a notch 220 and biasing flanges 222. The body 202 may alternately or additionally include flat tabs 224, 226 located between the plurality of fingers on one or more edges 208, 210 to locate the OSA positioning plate 200 in the proper z-direction.

Figure 4:
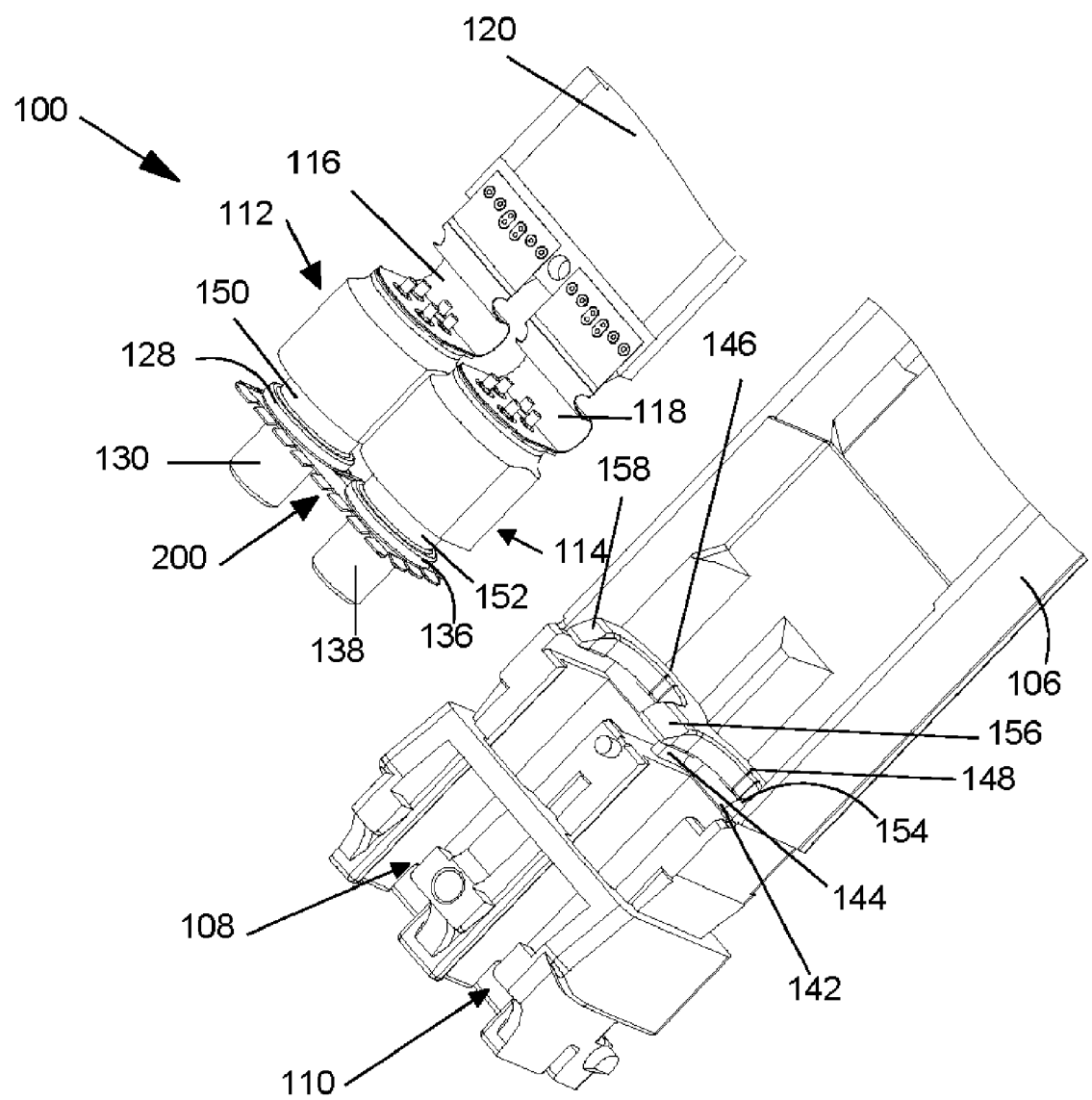
FIG. 4 illustrates an enlarged isometric view of an example optoelectronic transceiver module in accordance with an embodiment of the present invention.

With additional reference now to FIG. 4, the example OSA positioning plate 200 fits snug up against the flanges 128, 136 and over the nosepieces 130, 138 of the TOSA 112 and the ROSA 114, respectively. FIG. 4, further illustrates a slot 142 defined in the bottom shell 106. The slot 142 is configured to receive the OSA positioning plate 200 and the flanges 128 and 136 after the OSA positioning plate 200 has been positioned over the nosepieces 130, 138 of the TOSA 112 and the ROSA 114, respectively. The slot 142 also includes a ridge 144 configured to engage a corresponding notch 220 in the OSA positioning plate 200.

The back side of the slot 142 is defined by a pair of saddles 146, 148 which are configured to receive a neck portion 150 of the TOSA 112 and a neck portion 152 of the ROSA 114, respectively. The saddles 146, 148 are bordered by posts 154, 158 and separated by a post 156. The posts 154, 156, 158 are each defined in the bottom shell 106.

During assembly, the first port 216 is configured to receive the nose 130 of the TOSA 112. The second port 218 is similarly configured to receive the nose 138 of the ROSA 114. After receiving the noses 130, 138 of the TOSA 112, and the ROSA 114, respectively, the OSA positioning plate 200 can be positioned within the slot 142 of the bottom shell 106. The top shell 104 can be secured to the bottom shell 106. Once the top shell 104 is secured to the bottom shell 106, the OSA positioning plate 200 substantially secures the TOSA 112 and the ROSA 114 in an x-direction and a y-direction within the optoelectronic transceiver module 100. When the OSA positioning plate 200 is installed into the slot 142, the flat tabs 224, 226 on the edges 208, 210 of the OSA positioning plate 200 make contact with the bottom shell 106 and prevent further movement in the y direction. This accurately positions the OSA positioning plate 200 and the OSAs 112, 114 in the correct y axis position relative to the input and output ports 108, 110 defined in the bottom shell 106.

In the example embodiments of FIGS. 2-4, each of the fingers 214 is configured to contact either the top shell 104 or the bottom shell 106 once the OSA positioning plate 200 is positioned within the bottom shell 106 and the top shell 104 is secured to the bottom shell 106. In particular, each of the fingers 214 can be spring-loaded so that as the fingers 214 make contact with the top shell 104 and the bottom shell 106, the fingers 214 bias the body 202 against the front of the flanges 128, 136, which results in the flanges 128, 136 being biased against the posts 154, 156, 158 defined in the bottom shell 106. Thus, the fingers 214 can serve to resiliently bias the flanges 128, 136 against a portion of the shell 106.

The diameters of the flanges 128, 136 are larger than the diameter of the saddles 146, 148, respectively. These larger diameters of the flanges 128, 136 allow the flanges 128, 136 to be biased against the posts 154, 156, 158 without the flanges 128, 136 slipping through the saddles 146, 148. The biasing of the flanges 128, 136 against the posts 154, 156, 158 substantially secures the TOSA 112 and the ROSA 114 in a z-direction within the optoelectronic transceiver module 100. Further, as discussed above, the body 202 defines the notch 220 and biasing flanges 222 that are configured to engage the ridge 144 within the slot 142 of the bottom shell 106 to aid in the accurate placement of the OSA positioning plate 200 during assembly. The notch 220 and the biasing flanges 222 also aid in preventing motion of the OSA positioning plate 200 in the x-direction after assembly.

The size, location, number, and shape of the fingers 214 disclosed in FIGS. 2 and 3 can vary in alternative embodiments. For example, the size of the fingers 214 can be increased or decreased. In addition, the fingers 214 can be located anywhere along the top, sides, or the bottom side of the body 202 of the OSA positioning plate 200. Further, the number of fingers 214 can be greater or fewer than disclosed in FIGS. 2 and 3. Also, the shapes of the fingers 214 need not be identical to the shapes disclosed in FIG. 2, but could be instead any other suitable shapes including hemmed or curved fingers. It is contemplated that the fingers 214 can be replaced in one alternative embodiment with one or more other spring-loaded components that function to bias the TOSA 112 and the ROSA 114, respectively, against structures of the optoelectronic transceiver module 100 in order to substantially secure the TOSA 112 and the ROSA 114 in the z-direction within the optoelectronic transceiver module 100.

The example OSA positioning plate 200 can be formed from any suitable material including, but not limited to stainless steel sheet metal. The OSA positioning plate 200 can also have various thicknesses as long as the thickness allows the OSA positioning plate 200 and the flanges 128, 136 to fit within the slot 142.

The example OSA positioning plate 200 can help secure the TOSA 112 and the ROSA 114 in an accurate x, y, and z optical alignment with the output port 108 and the input port 110, respectively. In addition, the OSA positioning plate 200 can help solve problems associated with gaps that result from manufacturing tolerances of the top shell 104, the bottom shell 106, the TOSA 112, and the ROSA 114. Further, as the optoelectronic transceiver module 100 is vibrated during assembly and use, the OSA positioning plate 200 can help dampen the vibration and maintain the TOSA 112 and the ROSA 114 in an accurate x, y, and z optical alignment with the output port 108 and the input port 110, respectively.

Although embodiments of an OSA positioning plate discussed above are configured to secure a plurality of OSAs, embodiments of the invention additionally contemplate an OSA positioning plate configured to secure a single OSA. An OSA positioning plate configured to secure a single OSA may similarly employ the principles of the present invention. In particular, the OSA positioning plate may include a substantially flat body defining a port and a plurality of edges, each edge including one or more resilient fingers. The fingers may be configured to bias the flange of the corresponding OSA against corresponding posts of a saddle defined in an optoelectronic module when assembled within the module. In this case, an optoelectronic transceiver module having a TOSA and a ROSA may include two separate OSA positioning plates configured to individually secure the TOSA and the ROSA within the optoelectronic transceiver module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical subassembly positioning plate comprising:
   a substantially flat body defining at least one edge;
   a port defined in the body, the port being configured to receive and secure an optical subassembly in an x-direction and a y-direction when the optical subassembly positioning plate is positioned within an optoelectronic transceiver module;
   a plurality of fingers defined along at least one edge of the body, each of the plurality of fingers configured to contact a shell of the optoelectronic transceiver module so as to bias a flange of the optical subassembly against a portion of the shell of the optoelectronic transceiver module such that the optical subassembly is substantially retained in a z-direction when the optical subassembly positioning plate is positioned within the optoelectronic transceiver module.

2. The optical subassembly positioning plate of claim 1, wherein the port defined in the body comprises a first port and the optical subassembly comprises a first optical subassembly, and wherein the optical subassembly positioning plate further comprises a second port defined in the body, the second port being configured to receive and secure a second optical subassembly in an x-direction and a y-direction when the optical subassembly positioning plate is positioned within the optoelectronic transceiver module.

3. The optical subassembly positioning plate of claim 1, wherein the plurality of fingers is configured to bias the flange of the optical subassembly against a saddle of the shell.

4. The optical subassembly positioning plate of claim 1, wherein each of the plurality of fingers is resilient and configured to dampen vibrations when the optoelectronic transceiver module is subjected to a shock force.

5. The optical subassembly positioning plate of claim 1, wherein the body is made of sheet metal.

6. The optical subassembly of claim 1, wherein a notch defined in the body is configured to removably secure the optical subassembly positioning plate within the shell when the optical subassembly positioning plate is positioned within the optoelectronic transceiver module.

7. An optical subassembly positioning plate comprising:
   a substantially flat body defining at least one edge;
   a first port defined in the body, the first port being sized and configured to receive and secure a first optical subassembly in an x-direction and a y-direction when the optical subassembly positioning plate is positioned within an optoelectronic transceiver module;
   a second port defined in the body, the second port being sized and configured to receive and secure a second optical subassembly in an x-direction and a y-direction when the optical subassembly positioning plate is positioned within the optoelectronic transceiver module; and
   a plurality of fingers defined along at least one edge of the body, each of the plurality of fingers configured to contact a shell of the optoelectronic transceiver module so as to bias a flange of the first optical subassembly and a flange of the second optical subassembly against a portion of the shell of the optoelectronic transceiver module such that the first and second optical subassemblies are substantially secured in a z-direction when the optical subassembly positioning plate is positioned within the optoelectronic transceiver module.

8. The optical subassembly positioning plate of claim 7, wherein the fingers are spring-loaded.

9. The optical subassembly positioning plate of claim 7, wherein the body is made of sheet metal.

10. The optical subassembly positioning plate of claim 7, wherein the body includes a notch configured to engage a ridge defined within the shell.

11. The optical subassembly positioning plate of claim 10, wherein the notch further includes biasing flanges for securing the body with the ridge.

12. The optical subassembly positioning plate of claim 7, wherein each finger includes any member configured to resiliently bias the flange of the first optical subassembly and the flange of the second optical subassembly.

13. An optoelectronic device for use in an optical communication network, comprising:
   a first optical subassembly;
   a second optical subassembly;
   a shell defining a slot configured to receive an optical subassembly positioning plate; and
   the optical subassembly positioning plate, including:
      a body, the body defining a first port and a second port, each of the first and second port being configured to receive and secure one of the first optical subassembly and the second optical subassembly, respectively, within the optoelectronic device; and
      a plurality of fingers defined along at least one edge of the body, each of the plurality of fingers configured to contact the shell of the optoelectronic device so as to bias a flange of one of the first optical subassembly and the second optical subassembly against a portion of the shell.

14. The optoelectronic device of claim 13, wherein the optical subassembly positioning plate is positioned to snugly engage with the flange of one of the first optical subassembly and the second optical subassembly.

15. The optoelectronic device of claim 13, wherein the slot includes a ridge configured to engage a notch defined in the body of the optical subassembly positioning plate.

16. The optoelectronic device of claim 15, wherein the ridge is configured to secure the body of the optical subassembly positioning plate by receiving biasing flanges defined in the notch.

17. The optoelectronic device of claim 13, wherein each one of the fingers is configured to resiliently bias the flange of one of the first optical subassembly and the second optical subassembly against a saddle of the shell of the optoelectronic device.

18. The optoelectronic device of claim 13, wherein a plurality of posts defined in the shell is configured to support the flanges of one of the first optical subassembly and the second optical subassembly.

19. The optoelectronic device of claim 13, wherein each of the first port and the second port is configured to receive and secure one of the first optical subassembly and the second optical subassembly in an x-direction and a y-direction, and the plurality of fingers is configured to substantially secure the first optical subassembly and the second optical subassembly in a z-direction.

20. The optoelectronic device of claim 13, wherein the optoelectronic device is substantially compliant with the SFP+ (IPF) MSA.

* * * * *